Feb. 5, 1952 F. KESSLER 2,584,210

AUTOMATIC TELEPHONE AND CODE CALL SYSTEM

Filed Oct. 15, 1947 2 SHEETS—SHEET 1

FIG I

*INVENTOR.*
Frank Kessler

BY *Smith, Olsen & Baird*

Attys.

INVENTOR.
Frank Kessler
BY
Smith, Olsen & Baird
Attys.

Patented Feb. 5, 1952

2,584,210

UNITED STATES PATENT OFFICE 2,584,210

AUTOMATIC TELEPHONE AND CODE CALL SYSTEM

Frank Kessler, Rochester, N. Y., assignor to Automatic Electric Laboratories, Inc., Chicago, Ill., a corporation of Delaware Application October 15, 1947, Serial No. 779,951

27 Claims. (Cl. 179—18)

Figure 1:
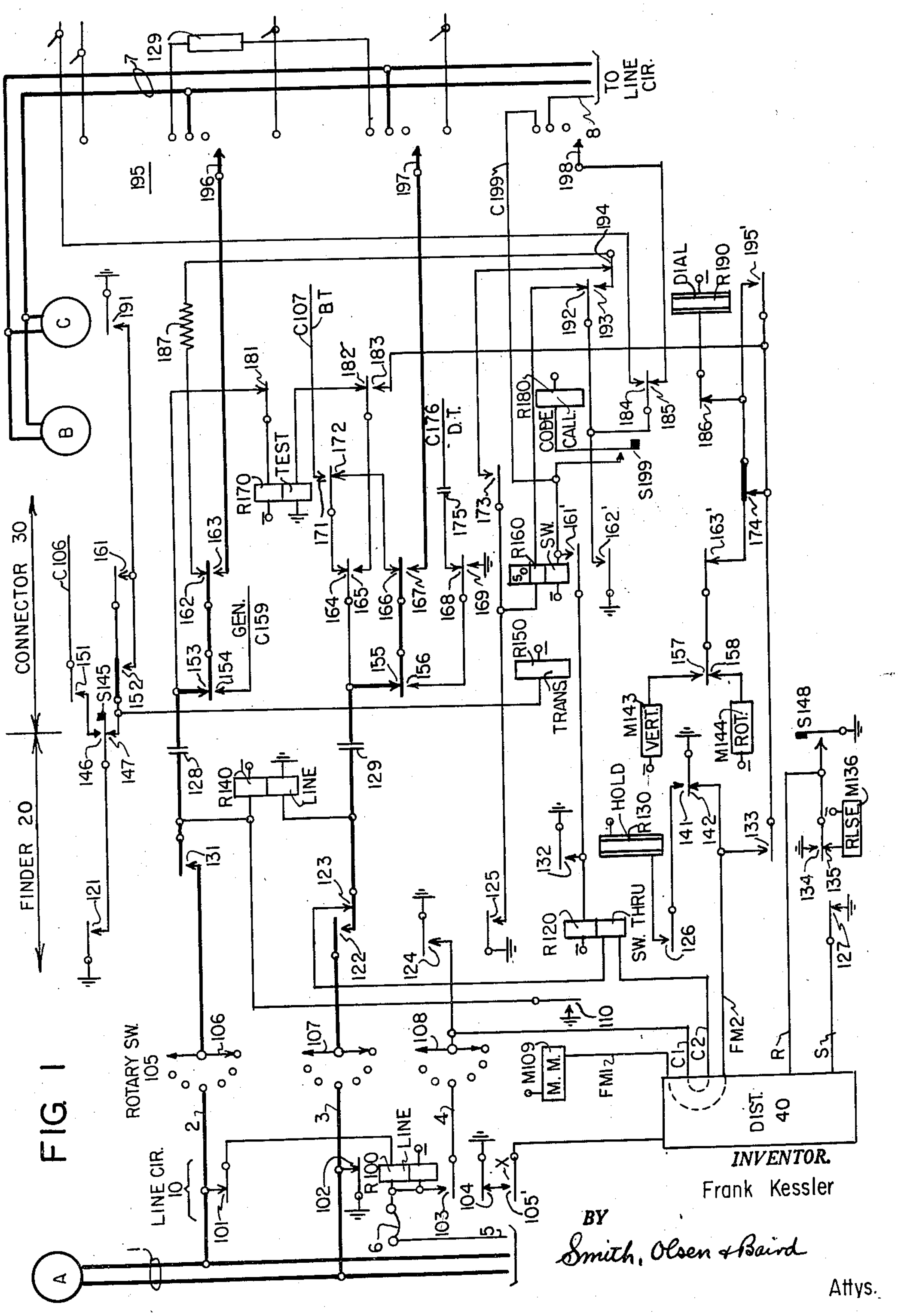

The present invention relates to automatic telephone systems provided with code call apparatus.

Small privately owned automatic telephone systems serving a plant, office or the like, are frequently provided with associated code call apparatus so that persons may be called thereon when they are away from their telephone stations. Conventional code call apparatus comprises an incoming or calling trunk and an outgoing or answering trunk that are respectively selected by two automatic switches under the respective control of the calling telephone station and of the answering telephone station in response to the dialing at the telephone station initiating the code call and at the telephone station answering the code call two respective directory numbers.

While code call apparatus of the type noted is satisfactory in service, it is not as flexible in operation as is desirable and use thereof at any time is restricted to the calling telephone station and to the answering telephone station.

Accordingly, it is a general object of the present invention to provide an automatic telephone system and associated code call apparatus of improved connection and arrangement capable of extremely flexible operation and use by two or more telephone stations simultaneously.

Another object of the invention is to provide the combination noted, wherein the code call apparatus may be seized by the associated automatic telephone system in response to dialing of a single predetermined directory number at a telephone station in the system regardless of whether the station is initiating the code call or is answering the code call.

Another object of the invention is to provide the combination noted, wherein the code call apparatus comprises a single terminal set that is seized both by the automatic switch associated with the telephone station initiating the call and by the automatic switch associated with the telephone station answering the code call.

Another object of the invention is to provide the combination noted, wherein the code call apparatus may be selected by three or more telephone stations in order to set up a conference connection, and wherein any telephone station may enter or exit the conference connection at any time without disturbing the established conference connection.

A further object of the invention is to provide the combination noted, wherein the automatic telephone system comprises switching links of improved connection and arrangement.

A further object of the invention is to provide the combination noted, wherein the code call apparatus comprises mechanism of improved construction and arrangement.

A still further object of the invention is to provide the combination noted, wherein the code call apparatus is selectively controllable by the telephone stations in the automatic telephone system and also by an associated alarm device, the control of the code call apparatus by the associated alarm device being arranged in overriding relation with respect to the control thereof by the telephone stations in the automatic telephone system.

Further features of the invention pertain to the particular arrangement of the circuit elements of the system, whereby the above-outlined and additional operating features thereof are attained.

*Sect. 1.—The general arrangement of the telephone system and the apparatus incorporated therein*

Figure 2:
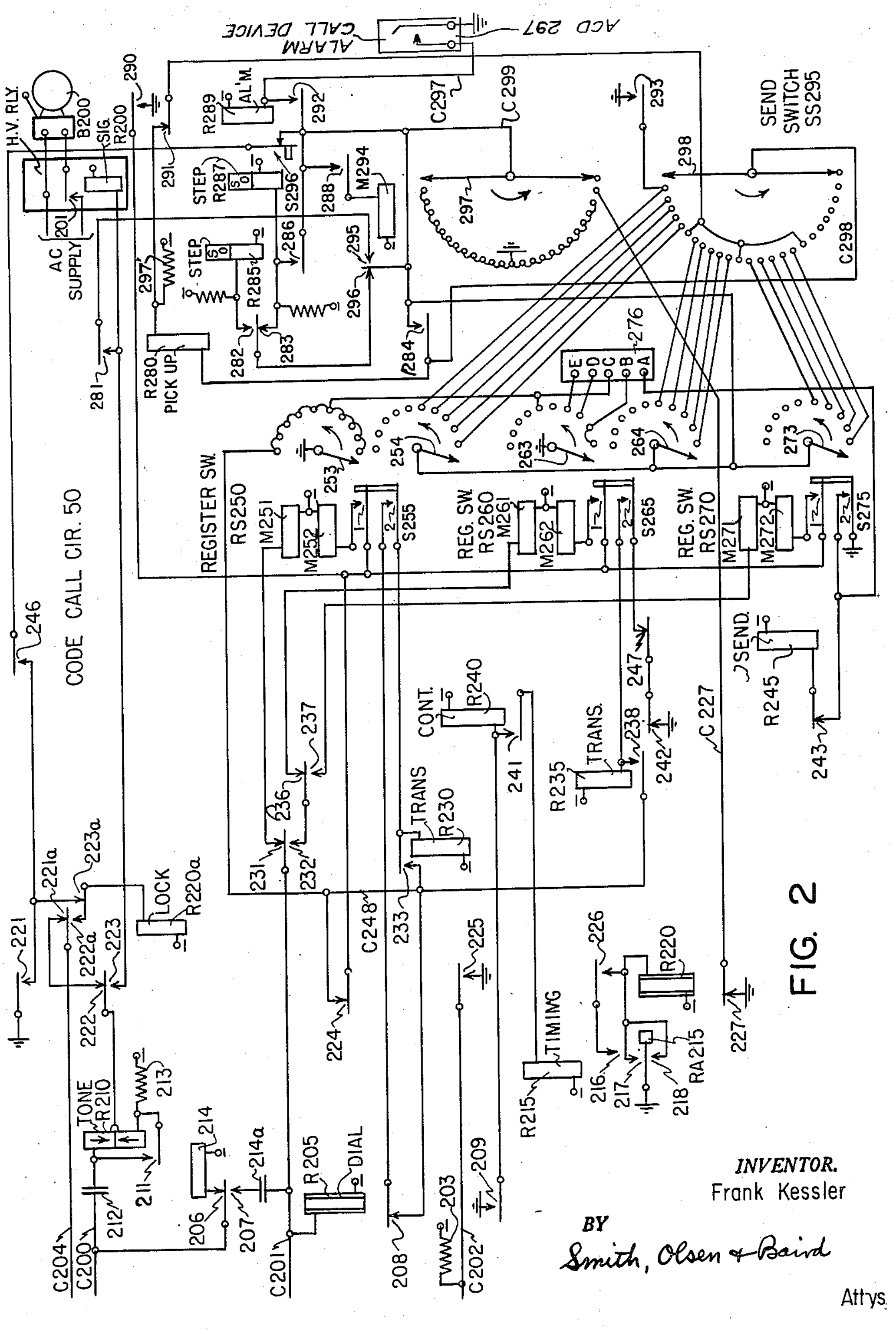

The invention, both as to its organization and method of operation, together with further objects and advantages thereof, will best be understood by reference to the following specification taken in connection with the accompanying drawings in which Figures 1 and 2, taken together, illustrate the general arrangement of the telephone system as well as the details of certain of the apparatus incorporated therein, which apparatus has embodied therein, the features of the invention as briefly outlined above. Specifically, Figs. 1 and 2 should be arranged respectively left and right in end-to-end relation. More particularly, Fig. 1 illustrates the details of a telephone line circuit, a finder and a connector incorporated in the telephone system; while Fig. 2 illustrates the details of a code call circuit incorporated in the telephone system.

Referring now more particularly to Figs. 1 and 2, the telephone system there illustrated serves a privately owned plant, office or the like and is normally termed a private automatic exchange system or P. A. X. The telephone system comprises private telephone lines, including the private telephone line 1 terminating at the private telephone station A, and party telephone lines, including the party telephone line 7 terminating at the party telephone stations B and C. Each telephone line is provided with a line circuit individual thereto, the telephone line 1 being provided with the line circuit 10 individual thereto. Preferably, each of the line circuits is identical to the line circuit 10 that comprises a line relay R100.

Also the telephone system comprises a plurality of finder-connector links, including the link illustrated and consisting of the finder 20 and the connector 30; and it is preferred that the links are identical. The finder 20 comprises a rotary switch 105 having access to the telephone lines 1, 7, etc., and including three individual wipers 106, 107 and 108 provided with associated contact banks, and a magnet M109 for driving the wipers noted step by step in the counterclockwise direction. Also the finder 20 comprises a relay group including a switch-through relay R120, a hold relay R130 and a line relay R140. The connector 30 comprises a Strowger mechanism 195 provided with a wiper carriage supporting three individual wipers 196, 197 and 198 provided with associated contact banks, a vertical magnet M143 for driving the wiper carriage step by step in the vertical direction away from its normal vertical position, a rotary magnet M144 for driving the wiper carriage step by step in the rotary direction away from its normal rotary position, and a release magnet M136 for releasing the wiper carriage and for causing it to be returned to its normal rotary and vertical positions. Also associated with the wiper carriage are two sets of switch springs S145 and S148 that are operated when the wiper carriage is driven one step in the vertical direction away from its normal vertical position. Further, a set of switch springs S199 is associated with the wiper carriage and operated when the wiper carriage is driven ten steps in the vertical direction away from its normal vertical position and ten steps in the rotary direction away from its normal rotary position. Also the connector 30 comprises a relay group including a transfer relay R150, a switch relay R160, a test relay R170, a code call relay R180 and a dial relay R190. Further, the Strowger mechanism 195 of the connector 30 has access to the telephone lines 1, 7, etc.

Also the telephone system comprises a conference circuit including the impedance 129 as well as a code-call circuit 50, both accessible to the Strowger mechanisms of the connectors 30, etc. Further a distributor 40 is associated with the line circuits 10, etc., and with the finder-connector links for the purpose of allotting the links to the use of calling telephone lines as explained more fully hereinafter.

The code-call circuit 50 comprises, a relay group including a dial relay R205, a tone relay R210, two timing relays R215 and R220, a lock relay R220*a*, two transfer relays R230 and R235, a control relay R240, a send relay R245, a pick-up relay R280, two step relays R285 and R287, a signal relay R200 and a fire alarm relay R289. Further, the code-call circuit 50 comprises an audible alarm signal in the form of a bell B200, a terminal board 276, three register switches RS250, RS260 and RS270 and a send switch SS295. The register switch RS250 is of the minor type including two individual wipers 253 and 254 provided with associated contact banks, a rotary magnet M251 for driving the wipers noted step by step in the counterclockwise direction away from their normal rotary positions, and a release magnet M252 for releasing the wipers noted and for causing them to be returned to their normal rotary positions. Also associated with the register switch RS250 is a set of switch springs S255 that is operated when the wipers noted are driven one step in the counterclockwise direction away from their normal rotary positions. The register switch RS260 is of the minor type, including two individual wipers 263 and 264 provided with associated contact banks, a rotary magnet M261 for driving the wipers noted step by step in the counterclockwise direction away from their normal rotary positions, and a release magnet M262 for releasing the wipers noted and for causing them to be returned to their normal rotary positions. Also associated with the register switch RS260 is a set of switch springs S265 that is operated when the wipers noted are driven one step in the counterclockwise direction away from their normal rotary positions. The register switch RS270 is of the minor type including a wiper 273 provided with an associated contact bank, a rotary magnet M271 for driving the wiper noted step by step in the counterclockwise direction away from its normal rotary position, and a release magnet M272 for releasing the wiper noted and for causing it to be returned to its normal rotary position. Also associated with the register switch RS270 is a set of switch springs S275 that is operated when the wiper noted is driven one step in the counterclockwise direction away from its normal rotary position. The send switch SS295 is of the rotary type, including two individual wipers 297 and 298 provided with associated contact banks, and a rotary magnet M294 for driving the wipers noted step by step in the counterclockwise direction away from their normal rotary positions. Also associated with the send switch SS295 is a set of switch springs S296 that is operated when the wipers noted are driven one step in the counterclockwise direction away from their normal rotary positions.

A better understanding of the connection and arrangement of the apparatus incorporated in the telephone system will be facilitated from a consideration of the arrangement of the terminal board 276 in the code-call circuit 50 and the extension of various calls involving the telephone lines and the code-call circuit 50 as explained hereinafter.

*Sect. 2.—The arrangement of the terminal board and the codes employed in the code call circuit*

The terminal board 276 in the code-call circuit 50 comprises five individual terminals A, B, C, D and E that may be selectively jumpered together in order to provide varying numbers of two digit codes and three digit codes to be employed in the telephone system; which codes are registered by the register switches RS250, RS260 and RS270 and sent by the send switch SS295 as explained more fully hereinafter.

In order to produce forty-five codes, of which twenty may be two digit codes and twenty-five may be three digit codes, the terminals A, B, D, and E on the terminal board 276 are connected together. The two digit codes are: 11 to 14, 21 to 24, 31 to 34, 41 to 44, and 51 to 54; and the three digit codes are 151 to 155, 251 to 255, 351 to 355, 451 to 455, and 551 to 555.

In order to produce sixty-five codes, of which fifteen may be two digit codes and fifty may be three digit codes, the terminals A, B and D on the terminal board 276 are connected together; and likewise the terminals C and E on the terminal board 276 are connected together. The two digit codes are 11 to 13, 21 to 23, 31 to 33, 41 to 43, and 51 to 53; and the three digit codes are 141 to 145, 241 to 245, 341 to 345, 441 to 445, 541 to 545, 151 to 155, 251 to 255, 351 to 355, 451 to 455 and 551 to 555.

In order to produce eighty-five codes, of which ten may be two digit codes and seventy-five may be three digit codes, the terminals A and B on the terminal board 276 are connected together; and likewise the terminals C, D and E on the terminal board 276 are connected together. The two digit codes are 11, 12, 21, 22, 31, 32, 41, 42, 51 and 52; and the three digit codes are 131 to 135, etc., 531 to 535, 141 to 145, etc., 541 to 545, 151 to 155, etc., and 551 to 555.

In order to produce 12 three digit codes, the terminals B, C, D and E on the terminal board 276 are connected together. The three digit codes are 111 to 115, etc., 151 to 155, 211 to 215, etc., 251 to 255, 311 to 315, etc., 315 to 355, 411 to 415, etc., 451 to 455, 511 to 515, etc., and 551 to 555.

*Sect. 3.—Extension of a local call from a calling telephone station to a called telephone station*

First assuming that a call is initiated at a calling telephone station, such for example, as the telephone station A on the private telephone line 1, a circuit, including the line conductors 2 and 3 of the telephone line 1 and the contacts 101 and 102 is completed for energizing in series the upper and lower windings of the line relay R100 in the line circuit 10 individually associated with the telephone line 1; whereby the line relay R100 operates through its first step, it being of the two-step type. Upon operating through its first step, the line relay R100 completes, at the contacts 103, a connection between the control conductor 4 of the telephone line 1 and the junction between the upper and lower windings of the line relay R100; and completes, at the contacts 105', a path, including the contacts 104, for applying ground potential to the start conductor extending to the distributor 40 in order to initiate operation thereof. Assuming that the distributor 40 has previously selected the link illustrated, consisting of the finder 20 and the connector 30, when operation of the distributor 40 is initiated, the conductors FM1 and FM2 are connected together, and a circuit, including the contacts 142, is completed for operating the rotary magnet M109 of the rotary switch 105. Upon operating the rotary magnet M109 completes, at the contacts 110, a circuit for energizing the upper winding of the line relay R140 in order to cause the latter relay to operate. Upon operating the line relay R140 interrupts, at the contacts 142, the previously traced circuit for operating the rotary magnet M109; whereby the rotary magnet M109 restores driving the wipers noted of the rotary switch one step in the counterclockwise direction from their last operated positions; and interrupting, at the contacts 110, the circuit for energizing the upper winding of the line relay R140 in order to cause the latter relay to restore. Upon restoring the line relay R140 recompletes, at the contacts 142, the circuit for operating the rotary magnet M109; whereby the rotary magnet M109 and the line relay R140 interact in the manner described in order to cause the wipers noted of the rotary switch 105 to be driven step by step in the counterclockwise direction into engagement with the contacts in the associated contact bank terminating the conductors 2, 3 and 4 of the telephone line 1 extending to the line circuit 10. Specifically, the rotary switch 105 selects the telephone line 1 extending to the calling telephone station A; whereby there is completed a circuit, including the contacts 123, the conductors C2 and C1, the wiper 108, of the rotary switch 105 the contact conductor 4 and the contacts 103, for energizing in series the lower windings of the line relay R140, the switch relay R120, and the line relay R100; whereby the line relay R140 is retained in its operated position to prevent further operation of the rotary magnet M109 and the switch-through relay R120 is operated. Upon operating the switch-through relay R120 completes, at the contacts 126, a circuit, including the contacts 141, for operating the hold relay R130. Upon operating the hold relay R130 completes, at the contacts 132, a holding circuit for energizing the upper winding of the switch-through relay R120. Also the switch-through relay R120 completes, at the contacts 124, a path for applying direct ground potential to the wiper 108 of the rotary switch 105 and consequently to the control conductor 4, completing a low resistance circuit for energizing directly the lower winding of the line relay R100 in order to cause the latter relay to operate through its second step. When the line relay R100 operates through its second step, it interrupts, at the contacts 101 and 102, the previously traced circuit for energizing the upper and lower windings thereof across the line conductors 2 and 3 of the telephone line 1; and interrupts, at the contacts 104, the path for applying ground potential to the start conductor extending to the distribuor 40; whereby the distributor 40 operates to select another idle link for the use of the next calling telephone line.

Also the switch-through relay R120 interrupts, at the contacts 127, the path for applying ground potential to the S conductor extending to the distributor 40; and the hold relay R130 completes, at the contacts 134, a path for applying ground potential to the R conductor extending to the distributor 40; whereby the link illustrated is marked as busy to the distributor 40. Further the switch-through relay R120 interrupts, at the contacts 123, the previously traced series circuit for energizing the lower windings of the line relay R140, the switch-through relay R120 and the line relay R100; and completes, at the contacts 122, a direct loop circuit, including the contacts 131, the wipers 106 and 107 of the rotary switch 105 and the line conductors 2 and 3 of the telephone line 1 for energizing in series the upper and lower windings of the line relay R140 in order to retain the latter relay in its operated position at this time directly from the calling telephone station A. Further the switch-through relay R120 completes, at the contacts 121, a circuit, including the contacts 147 of the set of switch springs S145, for operating the transfer relay R150 in the connector 30. Also the application of direct ground potential to the control conductor 4 of the telephone line 1 completes a path, including the jumper 6 for applying ground potential to the control conductor 5 thereof; thereby to mark the telephone line 1 as busy to the connectors having access thereto. Upon operating the transfer relay R150 completes, at the contacts 156, a connection, including the contacts 168, 166, 172, 164, and 122, the condensers 129 and 175 and the wiper 107 of the rotary switch 105 between the dial tone conductor C176 and the line conductor 3 of the telephone line 1; whereby dial tone is returned over the connection to the calling telephone station A in order to indicate to the person thereat that he may proceed to dial the directory number of the called telephone station.

Now assuming that the present call is to be extended to the called party telephone station B terminating the party line 7, the person at the calling telephone station A first dials the two digits comprising the directory number of the telephone line 7. The line relay R140 follows the impulses of the first digit; and each time it restores and then reoperates, it interrupts and then recompletes, at the contacts 141, the circuit for energizing the winding of the hold relay R130; whereby the latter relay, being of the slow-to-release type, is retained in its operated position during impulsing. Also each time the line relay R140 restores and then reoperates, it completes and then interrupts, at the contacts 142, a circuit, including the contacts 133, 174, 163' and 157, for operating the vertical magnet M143 of the Strowger mechanism 195; whereby the wiper carriage of the Strowger mechanism 195 is driven a corresponding number of steps in the vertical direction away from its normal vertical position. Also each time the line relay R140 restores and then reoperates, it completes and then interrupts, at the contacts 142, a multiple circuit, including the contacts 133, 174 and 186, for energizing the winding of the dial relay R190; whereby the latter relay operates and remains operated during impulsing as it is of the slow-to-release type. Upon operating the dial relay R190 completes, at the contacts 195', a point in multiple to the contacts 174, in the circuit for energizing the winding thereof; and completes, at the contacts 191, a holding circuit, including the contacts 152 for retaining operated the transfer relay R150. When the wiper carriage of the Strowger mechanism 195 is driven one step in the vertical direction away from its normal vertical position, the sets of switch springs S148 and S145 are operated. More particularly, the set of switch springs S145 is operated to interrupt, at the contacts 147 thereof, the previously traced original circuit for energizing the winding of the transfer relay R150; and the contacts 146 thereof are closed to complete a path, including the contacts 121 and 151, for applying ground potential to the associated motor start conductor C106. At the conclusion of the first digit, the line relay R140 is retained operated; whereby the dial relay R190 is restored shortly thereafter, it being of the slow-to-release type. Upon restoring the dial relay R190 interrupts, at the contacts 191, the previously traced holding circuit for retaining operated the transfer relay R150; whereby the latter relay upon restoring interrupts, at the contacts 156, the previously traced path for returning dial tone current from the dial tone conductor C176 to the calling telephone station A; interrupts, at the contacts 157, a further point in the circuit for operating the rotary magnet M143 of the Strowger mechanism 195; and prepares, at the contacts 158, a point in a circuit traced hereinafter for operating the rotary magnet M144 of the Strowger mechanism 195.

The line relay R140 then follows the impulses of the second digit. Each time the line relay R140 restores and then reoperates, it completes and then interrupts, at the contacts 142, the circuit, including the contacts 133, 174, 163' and 158, for operating the rotary magnet M144, and a multiple circuit, including the contacts 133, 174 and 186, for energizing the winding of the dial relay R190. Accordingly, at this time, the rotary magnet M194 is operated a number of times corresponding to the impulses of the second digit in order to drive the wiper carriage of the Strowger mechanism 195 a corresponding number of steps in the rotary direction away from its normal rotary position; and the dial relay R190 is operated and remains operated during impulsing as it is of the slow-to-release type. At the conclusion of the second digit, the wipers 196, 197 and 198 of the Strowger mechanism 195 have selected the telephone line 7 extending to the called party telephone station B; and the idle or busy condition of the selected telephone line 7 is tested at this time.

First assuming that the selected telephone line 7 is busy at this time, ground potential in the associated line circuit is applied to the control conductor 8 thereof engaged by the test wiper 198 of the Strowger mechanism 195, completing a circuit, including the contacts 185, 193, 162, 153 and 181 and the resistor 187, for energizing the upper winding of the test relay R170; whereby the latter relay operates to prepare, at the contacts 173, a holding circuit traced hereinafter for energizing the upper winding thereof. Also at the conclusion of the first digit, the line relay R140 is retained in its operated position and shortly thereafter, the dial relay R190 restores as it is of the slow-to-release type, completing, at the contacts 194, the previously mentioned holding circuit, including the contacts 125, 173, 162, 153 and 181 and the resistor 187, for energizing the upper winding of the test relay R170. Also upon restoring the dial relay R190 completes, at the contacts 192, a path, including the contacts 125 and 185, the control wiper 198 of the Strowger mechanism 195 and the grounded control conductor 8 of the selected telephone line 7, for short-circuiting the upper winding of the switch relay R160 in order to prevent operation of the latter relay at this time. Also upon operating the test relay R170 completes, at the contacts 171, a connection, including the contacts 164 and 122, the condenser 129 and the line wiper 107 of the rotary switch 105 between the busy tone conductor C107 and the line conductor 3 of the telephone line 1 extending to the calling telephone station A; whereby busy tone current is returned thereto indicating to the person thereat that the called telephone station B is busy at this time. Also the test relay R170 interrupts, at the contacts 174, a further point in the circuit for operating the dial relay R190 in order positively to prevent reoperation of the latter relay at this time should the person at the calling telephone station A dial another digit.

At this time the person at the calling telephone station A may disconnect in order to bring about the release of the link illustrated in a manner substantially identical to that explained hereinafter or he may cause the connector 30 to camp on the busy telephone line 7 until it becomes idle. Assuming that the person at the calling telephone station A causes the connector 30 to camp on the busy telephone line 7, when it becomes idle ground potential is removed from the control conductor 8 thereof and battery potential is applied to the control conductor in the associated line circuit. The application of battery potential to the control conductor 8 completes a circuit including the control wiper 198 of the Strowger mechanism 195, the contacts 185, 192 and 125, for energizing the upper winding of the switch relay R160; whereby the latter relay operates shortly thereafter, it being of the slow-to-operate type. Upon operating the switch relay R160 interrupts, at the contacts 162, the holding circuit for retaining operated the test relay R170; whereby the latter relay restores to interrupt, at the contacts 171, the path for returning busy tone current back over the connection to the calling telephone station A. Also upon operating the switch relay R160 switches the connector 30 through; whereby the telephone line 7 is seized by the connector 30 in a manner identical to that in which it is seized incident to testing thereof as idle as explained below.

Now assuming that the telephone line 7 is idle when it is selected by the wipers noted of the Strowger mechanism 195, battery potential in the line circuit associated therewith is applied to the control conductor 8 of the telephone line 7, thereby to complete a circuit substantially identical to that previously traced for short-circuiting the upper winding of the test relay R170 in order positively to prevent operation of the latter relay. Shortly following the second digit, the dial relay R190 restores as previously noted interrupting, at the contacts 193, the path mentioned for short-circuiting the upper winding of the test relay R170; and completing, at the contacts 192, a circuit substantially identical to that previously traced for energizing the upper winding of the switch relay R160. When the upper winding of the switch relay R160 is thus energized, it operates shortly thereafter, it being of the slow-to-operate type to complete, at the contacts 161′, a holding circuit, including the contacts 132, for energizing the lower winding thereof. Also the switch relay R160 completes, at the contacts 162′, a path, including the contacts 185, for applying ground potential to the control wiper 198 and consequently to the control conductor 8 of the selected telephone line 7, thereby to mark the telephone line 7 as busy to the connectors of the other links having access thereto and also to effect operation of the line relay in the line circuit associated with the telephone line 7. Also the switch relay R160 interrupts, at the contacts 163′, a further point in the circuit for operating the rotary magnet M144.

In order to effect signalling of the called party telephone station B, the person at the calling telephone station A dials one or more short or long ringing digits constituting the ringing code of the called party telephone station B. For example, the digit 5 may constitute a short ringing digit and the digit 0 may constitute a long ringing digit, so that the ringing code of the called party telephone station B may be readily dialed by the person at the calling telephone station A. When a ringing digit is dialed at this time at the calling telephone station A, the line relay R140 follows. Each time the line relay R140 restores and then reoperates, it completes and then interrupts, at the contacts 142, a circuit, including the contacts 133, 174 and 186, for energizing the winding of the dial relay R190 in order to cause the latter relay to operate and remain operated during impulsing. Upon operating the dial relay R190 completes, at the contacts 191, a circuit, including the contacts 161, for operating the transfer relay R150. Upon operating the transfer relay R150 completes, at the contacts 154, a connection, including the contacts 163, between the generator conductor C159 and the line wiper 196; and completes, at the contacts 156, a path, including the contacts 169, and 167, for applying ground potential to the line wiper 197. At the conclusion of the ringing digit, the line relay R140 is retained in its operated position causing the dial relay R190 to restore shortly thereafter. Upon restoring the dial relay R190 interrupts, at the contacts 191, the circuit for retaining operated the transfer relay R150. Upon restoring the transfer relay R150 interrupts, at the contacts 154 and 156, the path for projecting ringing current over the line wipers 196 and 197. Accordingly, when a short ringing digit or a long ringing digit is dialed at the calling telephone station A the line relay R140 follows retaining the dial relay R190 operated for a corresponding short time interval or a corresponding long time interval; whereby the operated dial relay R190 retains operated the transfer relay R150: whereby a corresponding short splash of ringing current or a corresponding long splash of ringing current is projected over the line wipers 196 and 197. The ringing current projected over the line wipers 196 and 197 traverses the line conductors of the telephone line 7 effecting operation of the ringers at the party telephone stations B and C. However, the code of the ringing current indicates that in fact the party telephone station B is the called party telephone station so that the person thereat is notified to answer the call.

At the conclusion of the ringing operation, the line relay R140 is retained in its operated position causing the restoration of the dial relay R190 and the transfer relay R150 as previously noted. Upon restoring the transfer relay R150 prepares, at the contacts 153 and 155, a circuit traced hereinafter for energizing in series the upper and lower windings of the test relay R170; and interrupts, at the contacts 151, the path for applying ground potential to the motor start conductor C106. Subsequently, when the person at the called party telephone station B answers the call a bridge path is completed between the line conductors of the telephone line 7, thereby to complete a circuit, including the line wipers 196 and 197, the contacts 163, 167 and 153, 155 and the contacts 165, 181 and 182 for energizing in series the upper and lower windings of the test relay R170; whereby the latter relay operates and supplies transmission battery to the called party telephone station B. Upon operating the test relay R170 interrupts, at the contacts 174, a further point in the circuit for operating the dial relay R190 in order to prevent operation of the latter relay in the event another digit is dialed at the calling telephone station A. At this time the loop circuit extending between the calling telephone station A and the line relay R140 is interconnected by the condensers 128 and 129 to the loop circuit extending between the called party telephone station B and the test relay R170; whereby an established connection is completed between the calling telephone station A and the called party telephone station B.

The release of the established connection is under the control of the person at the calling telephone station A and when a release is performed at the calling telephone station A, the loop circuit extending to the line relay R140 is interrupted, causing the latter relay to restore. Upon restoring, the line relay R140 interrupts, at the contacts 141, the circuit for retaining operated the hold relay R130 in order to cause the latter relay to restore shortly thereafter, it being of the slow-to-release type. Upon restoring the hold relay R130 completes, at the contacts 135, a circuit, including the set of switch springs S148, for operating the release magnet M136; whereby the wiper carriage of the Strowger mechanism 195 is released and returned to its normal rotary and vertical positions. When the Strowger mechanism 195 is thus released, the sets of switch springs S145 and S148 are operated. More particularly, the set of switch springs S148 is operated to interrupt the circuit for operating the release magnet M136. Also upon restoring the hold relay R130 interrupts, at the contacts 132, the multiple holding circuits for energizing the upper winding of the switch-through relay R120 and for energizing the lower winding of the switch relay R160 in order to cause the relays mentioned to restore. Also when the Strowger mechanism 195 is thus released, the loop circuit extending to the test relay R170 is interrupted, causing the latter relay to restore. Upon restoring the switch-through relay R120 interrupts, at the contacts 124, the holding circuit for energizing the lower winding of the line relay R100 in the line circuit 10 in order to cause the latter relay to restore. Upon restoring the line relay R100 interrupts, at the contacts 103, the connection between the control conductors 4 and 5 of the telephone line 1; whereby battery potential is applied by way of the lower winding of the line relay R100 and the jumper 6 to the control conductor 5 of the telephone line 1 in order to mark the telephone line 1 as idle to the connectors having access thereto. When the link illustrated is thus released, ground potential is removed from the control conductor 8 of the telephone line 7 in order to bring about the restoration of the line relay in the associated line circuit, assuming that the person at the party telephone station B has disconnected at this time. Accordingly, the established connection between the calling telephone station A and the called party telephone station B is released, and all of the apparatus involved therein is completely released and available for further use.

In view of the foregoing, it will be understood that a local call may be extended from the calling telephone station A to the called party telephone station C in an identical manner utilizing the same directory number; however, in this case after the telephone line 7 has been selected by the connector of the link in use and found to be idle, the person at the calling telephone station A dials a different ringing code individual to the called party telephone station C. Also it will be understood that the extension of a local call from a calling party telephone station, such for example, as the party telephone station B to the telephone station A is substantially identical to that described above except that the person a the calling party telephone station B dials a different directory number and a different ringing code individual to the called telephone line 1 and to the called telephone A, respectively.

*Sect. 4.—Extension of a code call*

As explained in Sect. 3, the person at the calling telephone station A may initiate a call via the link illustrated to the called party telephone station B by dialing the appropriate directory number and then by dialing the appropriate ringing code after the subscriber line 7 has been selected and tested as idle. At this time in the event the person at the called party telephone station B does not answer the call in a reasonable time interval, the person at the calling telephone station A may redial the ringing code in order to cause the link illustrated again to transmit the ringing code over the selected telephone line 7 to the called party telephone station B. In the event the person at the called party telephone station B again fails to answer the call within a reasonable time interval, the person at the calling telephone station A may assume that the person at the called party telephone station B is away from the called party telephone station B and cannot hear the ringer thereat. In this event, the person at the calling telephone station may wish to place the call on the code call circuit 50; which is accomplished first by performing a release at the calling telephone station A. The person at the calling telephone station A then initiates another call and the distributor 40 may again assign the link illustrated for use; whereby the finder 20 thereof again finds the telephone line 1 extending to the calling telephone station A. At this time the person at the calling telephone station A dials the directory number of the code call circuit 50 which may be 00; whereby the connector 30 responds to the two digits 0 and 0 in a manner identical to that previously explained in order to cause the wipers noted of the Strowger mechanism to select the trunk comprising the conductors C200, C201 and C202 extending to the code call circuit 50. In this case, when the wiper carriage of the Strowger mechanism 195 is driven ten steps in the rotary direction after being driven ten steps in the vertical direction, the set of switch springs S199 is operated to prepare a circuit traced hereinafter for operating the code call relay R180. At this time the connector 30 operates to test the idle or busy condition of the trunk mentioned extending to the code call circuit 50.

First assuming that the code circuit 50 is busy at this time, ground potential appearing upon the control conductor C202 of the trunk mentioned brings about operation of the test relay R170 in the connector 30; whereby busy tone current is returned over the connection to the calling telephone station A. At this time the person at the calling telephone station A may disconnect or cause the connector 30 to camp on the busy trunk mentioned. Assuming that the person at the calling telephone station A causes the connector 30 to camp on the busy trunk mentioned, when the code call circuit 50 becomes idle, battery potential is applied via the resistor 203 to the control the conductor C202 of the trunk mentioned; whereby the lower winding of the switch relay R160 is energized causing this relay to operate shortly thereafter. Upon operating the switch relay R160 effects the restoration of the test relay R170; whereby the latter relay upon restoring interrupts, at the contacts 171, the path for returning busy tone current over the connection to the calling telephone station A. Also upon restoring the switch relay R160 effects operation of the code call relay R180 and switches the connector 30 through to seize the trunk mentioned extending to the code call circuit 50 in a manner identical to that explained hereinafter when the trunk mentioned is initially tested as idle.

Now assuming that the code call circuit 50 is idle when it is selected by the connector 30, the previously traced path for short-circuiting the upper winding of the test relay R170 is completed in order positively to prevent operation of the latter relay. Shortly following the second digit 0, the dial relay R190 restores as previously noted interrupting, at the contacts 193, the path mentioned for short-circuiting the upper winding of the test relay R170; and completing, at the contacts 192, the previously traced circuit for energizing the upper winding of the switch relay R160 in order to cause the latter relay to operate. In this case, upon operating, the switch relay R160 not only completes, at the contacts 161', the previously traced holding circuit for energizing the lower winding thereof, but it also completes, at the contacts 161', a multiple circuit, including the set of switch springs S199, for operating the code call relay R180. Upon operating the code call relay R180 interrupts, at the contacts 181 and 182, the connections to the upper and lower windings of the test relay R170; and completes, at the contacts 184, a path, including the contacts 162', for applying ground potential to the start conductor C204 of the trunk extending to the code call circuit 50. The trunk extending to the code call circuit 50 is marked as idle to the connector 30 at this time by the application of battery potential via the resistor 203 to the control conductor C202 thereof.

The application of ground potential to the start conductor C204 of the trunk extending to the code call circuit 50 completes a circuit, including the contacts 221a and 222 and the resistor 213, for energizing the lower winding of the tone relay R210; whereby the latter relay operates to complete, at the contacts 211, a substantially identical circuit for energizing the upper winding thereof. The tone relay R110 is of the differential type; whereby it restores when both the upper and lower windings thereof are energized; interrupting, at the contacts 211, the circuit for energizing the upper winding thereof; whereby the tone relay R210 reoperates. Accordingly, the tone relay R210 operates buzzer fashion causing the associated condenser 212 to be charged and discharged alternately through the contacts 206 and the associated impedance 214. One terminal of the condenser 212 is connected via the line conductor C200 of the trunk mentioned, the line wiper 196 of the Strowger mechanism 195, the contacts 163 and 153, the condenser 128, the contacts 131 and the line wiper 106 of the rotary switch 105 to the line conductor 2 of the telephone line 1 extending to the calling telephone station A; whereby a ready tone is returned to the calling telephone station A indicating to the person thereat that the connector 30 has seized the trunk extending to the code call circuit 50 and that the code call circuit 50 is in readiness to receive the code number.

The person at the calling telephone station A dials the two digit or three digit code number that is assigned in the code call circuit 50 to the party telephone station B that was previously called directly via the link illustrated by the person at the calling telephone station A; whereby the line relay R140 follows the impulses of each of the digits of the code number. First assuming that the three digit code number 151 is assigned in the code call circuit 50 to the party telephone station B, the person at the calling telephone station A dials this code number causing the respective digits thereof to be registered in the register switches RS250, RS260 and RS270.

More particularly, the line relay R140 follows the impulses of the first code digit 1 of the code number 151 repeating, at the contacts 142, via the contacts 133, 183, 165, 155 and 167 to the line wiper 197 of the Strowger mechanism 195 and consequently to the line conductor C201 of the trunk mentioned extending to the code call circuit 50. In the present case the dial relay R190 is not operated incident to the transmission of the three digits of the code number 151 since the operated code call relay R180 retains interrupted, at the contacts 186, the circuit for energizing the winding thereof. Also the operated code call relay R180 retains interrupted, at the contacts 185, the normal path for applying ground potential to the control wiper 198 of the Strowger mechanism 195. The ground impulse of the first digit 1 of the code number 151 transmitted over the line conductor C201 of the trunk extending to the code circuit 50 effects operation of the dial relay R205; whereby the latter relay is retained in its operated position during impulsing as it is of the slow-to-release type. Also the ground impulse of the first digit 1 of the code number 151 transmitted over the line conductor C201 of the trunk mentioned passes via the contacts 231 to the rotary magnet M251 of the register switch RS250 in order to effect operation thereof; whereby the first digit 1 of the code number 151 is registered in the register switch RS250. More particularly, the wipers 253 and 254 of the register switch RS250 are driven one step in the counterclockwise direction away from their normal rotary positions into engagement with the first contacts in the associated contact banks; and the set of switch springs S255 is operated. Upon operating the dial relay R205 interrupts, at the contacts 206, the normal path for applying battery potential by way of the impedance 214 to the line conductor C200 of the trunk extending to the code call circuit 50; and completes, at the contacts 207, a path for bridging the condenser 214a across the line conductors C200 and C201 of the trunk mentioned. Also the dial relay R205 completes, at the contacts 209, a circuit for operating the control relay R240. Upon operating the control relay R240 completes, at the contacts 241, a circuit, including the contacts 209, for operating the timing relay R215. Upon operating the timing relay R215 attracts its armature RA215 to close the contacts 217 in order to complete a circuit for operating the timing relay R220. Upon operating the timing relay R220 completes, at the contacts 226, a holding circuit, including the contacts 216 and 217 for energizing the winding therof; and completes at the contacts 225, a path for applying ground potential to the control conductor C202 of the trunk extending to the code call circuit 50, thereby to mark the code call circuit 50 as busy to the connectors of the links having access thereto at this time. Also the timing relay R220 interrupts, at the contacts 224, a point in multiple paths traced hereinafter for operating the release magnets M252, etc., of the register switches RS250, etc., ground potential being applied to the hold conductor C248 at this time via the wiper 253 of the register switch RS250 and the engaged first contact in the associated contact bank. Further, the timing relay R220 interrupts, at the contacts 227, the path for applying ground potential to the skip conductor C227 for a purpose more fully explained hereinafter; and interrupts, at the contacts 222, the circuit for energizing the upper and lower windings of the tone relay R210 in order to cause the latter relay to restore and arrest the return of ready tone over the line conductor C200 of the trunk mentioned and the link illustrated and the telephone line 1 to the calling telephone station A. Also the timing relay R220 prepares, at the contacts 223, an alternative path for energizing in multiple the upper and lower windings of the tone relay R210; and completes, at the contacts 221, a circuit, including the contacts 223a, for operating the lock relay R220a. Upon operating the lock relay R220a completes, at the contacts 222a, a holding circuit, including the grounded start conductor C204 of the trunk mentioned for energizing the winding thereof; interrupts, at the contacts 221a, a further point in the previously traced original circuit for energizing in multiple the upper and lower windings of the tone relay R210; and interrupts, at the contacts 223a, the original operating circuit for energizing the winding thereof.

At the conclusion of the first digit 1 of the code number 151, the line relay R140 is retained in its operated position; whereby ground potential is removed from the line conductor C201 of the trunk mentioned, causing the dial relay R205 to restore shortly thereafter, it being of the slow-to-release type. Upon restoring the dial relay R205 completes, at the contacts 208, a circuit, including the grounded hold conductor C248 and the second contacts of the set of switch springs S255, for operating the transfer relay R230. Upon operating the transfer relay R230 completes, at the contacts 233, a holding circuit, including the grounded hold conductor C248, for energizing the winding thereof; interrupts, at the contacts 231 a further point in the circuit for operating the rotary magnet M251 of the register switch RS250; and prepares, at the contacts 232, a point in a circuit traced hereinafter for operating the rotary magnet M261 of the register switch RS260. Also upon restoring the dial relay R205 interrupts, at the contacts 209, the circuit for maintaining operated the control relay R240; whereby the latter relay upon restoring interrupts, at the contacts 241, the circuit for maintaining operated the timing relay R215. Upon restoring the timing relay R215 sets its armature RA215 into vibration; whereby the associated contacts 217 and 218 are alternately completed in order intermittently to energize the winding of the timing relay R220; whereby the latter relay is retained in its operated position for a considerable long time interval as it is of the slow-to-release type.

The person at the calling telephone station A then dials the second digit 5 of the code call number 151; whereby the line relay R140 again follows repeating, at the contacts 142, ground impulses over the line conductor C201 of the trunk extending to the code call circuit 50; whereby the dial relay R205 reoperates and remains operated during impulsing as it is of the slow-to-release type. Upon operating the dial relay R205 effects reoperation of the control relay R240 and the consequent reoperation of the timing relay R215; whereby the timing relay R220 is retained in its operated position during the inter-digit pause between the first and second digits of the code number 151. Also the ground impulses of the second digit 5 of the code number 151 are transmitted via the contacts 232 and 236 to the rotary magnet M261 of the register switch RS260; whereby the second digit 5 of the code number 151 is registered therein. More particularly, the wipers 263 and 264 of the register switch RS260 are driven to engage the fifth contacts in the associated contact banks; and the set of switch springs S265 is operated when the wipers noted of the register switch RS260 are driven one step in the counterclockwise direction away from their normal rotary positions. At the conclusion of the second digit 5, the line relay R140 is again retained in its operated position; whereby the dial relay R205 restores shortly thereafter, it being of the slow-to-release type. Upon restoring the dial relay R205 effects restoration of the control relay R240 and the consequent restoration of the timing relay R215; whereby the latter relay again sets its armature RA215 into vibration in order to retain operated the timing relay R220 for a considerable time interval. Upon restoring the control relay R240 completes, at the contacts 242, a circuit, including the contacts 247 and the second contacts of the set of switch springs S265, for operating the transfer relay R235. Upon operating the transfer relay R235 completes, at the contacts 238, a holding circuit, including the grounded hold conductor C248, for energizing the winding thereof; interrupts, at the contacts 236, a further point in the circuit for operating the rotary magnet M261 of the register switch RS260; and prepares, at the contacts 237, a point in a circuit traced hereinafter for operating the rotary magnet M271 of the register switch RS270.

The person at the calling telephone station A then dials the third digit 1 of the code number 151; whereby the line relay R140 again follows repeating at the contacts 142, ground impulses over the line conductor C201 of the trunk extending to the code call circuit 50; whereby the dial relay R205 reoperates and remains operated during impulsing as it is of the slow-to-release type. Upon reoperating, the dial relay R205 effects reoperation of the control relay R240 and the consequent reoperation of the timing relay R215; whereby the timing relay R220 is retained in its operated position during the inter-digit pause between the second and third digits of the code number 151. Also the ground impulse of the third digit 1 of the code number 151 is transmitted via the contacts 232 and 237 to the rotary magnet M271 of the register switch RS270; whereby the third digit 1 of the code number 151 is registered therein. More particularly, the wiper 273 of the register switch RS270 is driven to engage the first contact in the associated contact bank; and the set of switch springs S275 is operated when the wiper noted of the register switch RS270 is driven one step in the counterclockwise direction away from its normal rotary position. At the conclusion of the third digit 1, the line relay R140 is again retained in its operated position; whereby the dial relay R205 restores shortly thereafter, it being of the slow-to-release type. Upon restoring the dial relay R205 effects restoration of the control relay R240 and the consequent restoration of the timing relay R215; whereby the latter relay again sets its armature RA215 into vibration in order to retain operated the timing relay R220 for a considerable time interval.

Also upon restoring the control relay R240 completes, at the contacts 243, a circuit, including the second contacts of the set of switch springs S275 for operating the send relay R245. Upon operating the send relay R245 completes, at the contacts 246, a path, including the contacts 221 and the set of switch springs S296, for applying ground potential to the send conductor C299; whereby there is completed, a circuit, including the contacts 296 and 283, for energizing the winding of the step relay R287 in order to cause the latter relay to operate shortly thereafter, it being of the slow-to-operate type. Upon operating the step relay R287 completes, at the contacts 288, a circuit, including the grounded send conductor C299 for operating the rotary magnet M294 of the send switch SS295. Upon operating the rotary magnet M294 interrupts, at the contacts 296, the circuit for retaining operated the step relay R287. Upon restoring the step relay R287 interrupts, at the contacts 288, the circuit for retaining operated the rotary magnet M294. Upon restoring the rotary magnet M294 drives the wipers 297 and 298 of the send switch SS295 one step in the counterclockwise direction away from their home positions; and recompletes, at the contacts 296, the previously traced circuit for energizing the winding of the step relay R287 in order to cause the latter relay to operate shortly thereafter. The step relay R287 and the rotary magnet M294 interact in the above described manner; whereby the wipers noted of the send switch SS295 are driven step by step in the counterclockwise direction. When the wiper 297 of the send switch SS295 is driven one step in the counterclockwise direction away from its normal home position, it engages the first contact in the associated contact bank included in the grounded multiple, thereby to complete an alternative path for applying ground potential to the send conductor C299; and operates the set of switch springs S296 in order to interrupt the original path for applying ground potential to the send conductor C299. In the present example, the first digit 1 is registered in the register switch RS250. Accordingly, when the wiper 298 of the send switch SS295 engages the fifth contact in the associated contact bank connected to the first contact in the contact bank engaged by the wiper 254 of the register switch RS250, the grounded send conductor C299 is connected through to the pick-up conductor C298, thereby to complete a circuit, including the resistor 297′, for energizing the winding of the pick-up relay R280 in order to cause the latter relay to operate. Upon operating the pick-up relay R280 completes, at the contacts 284, a holding circuit, including the resistor 297′ and the grounded send conductor C299, for energizing the winding thereof; interrupts, at the contacts 283, a further point in the circuit for energizing the winding of the step relay R287; and prepares, at the contacts 282, a point in a circuit traced hereinafter for energizing the winding of the step relay R285. Accordingly, when the rotary magnet M294 restored the fifth time, it completed, at the contacts 296, a circuit, including the contacts 282 and the grounded send conductor C299, for energizing the winding of the step relay R285; whereby the latter relay is operated shortly thereafter, it being of the slow-to-operate type. Upon operating the step relay R285 completes, at the contacts 286, a circuit, including the grounded send conductor C299 for energizing the winding of the step relay R287; whereby the latter relay operates shortly thereafter, it being of the slow-to-operate type. Upon operating the step relay R287 completes, at the contacts 288, the circuit for operating the rotary magnet M294. Upon operating the rotary magnet M294 interrupts, at the contacts 296, the circuit for retaining operated the step relay R285; and completes, at the contacts 295, a circuit, including the contacts 281, for operating the signal relay R200 and a multiple circuit, including the contacts 223, for energizing in multiple the upper and lower windings of the tone relay R210. Upon operating the signal relay R200 completes, at the contacts 201 a circuit, including the commercial source of A. C. supply, for operating the alarm bell B200; whereby a loud audible sound or signal is emitted thereby. Also the tone relay R210 operates to cause a corresponding splash of signal tone to be retuned over the connection, including the link illustrated and the telephone line 1, to the calling telephone station A.

Upon restoring the step relay R285 effects the restoration of the step relay R287; whereby the latter relay effects the restoration of the rotary magnet M294. Upon restoring the rotary magnet M294 interrupts, at the contacts 295, the circuit for retaining operated the signal relay R200 and the multiple circuit for effecting operation of the tone relay R210. Upon restoring the signal relay R200 interrupts, at the contacts 201, the circuit for operating the signal bell B200; and upon restoring the tone relay R210 arrests the return of the signal tone over the connection to the calling telephone station A. Also upon restoring the rotary magnet M294 drives the wipers noted of the send switch SS295 into engagement with the sixth contacts in the associated contact banks; and recompletes, at the contacts 296, the circuit for energizing the winding of the step relay R285. Accordingly, the step relay R285 tends to operate shortly thereafter to effect reoperation shortly thereafter of the step relay R285 and the consequent reoperation of the rotary magnet M294; whereby the rotary magnet M294 would again operate the signal relay R200 and effect operation of the tone relay R210; whereby the signal relay R200 would again effect operation of the signal bell B200 and the tone relay R210 would again return signal tone over the connection to the calling telephone station A.

Accordingly, the step relays R285 and R287 interact with the rotary magnet M294 at this time in order to drive the wipers noted of the send switch SS295 into engagement with the sixth contacts in the associated contact banks; whereby the signal relay R200 and the tone relay R210 are once operated. The signal relay R200 effects one operation of the signal bell B200 and the tone relay R210 effects the return of one splash of signal tone over the connection to the calling telephone station A; all in accordance with the first digit 1 of the code number registered in the register switch RS250.

However, when the wiper 298 of the send switch SS295 engages the sixth contact in the associated contact bank, a path including the contacts 291 and a pick-up conductor C298 is completed for short-circuiting the winding of the pick-up relay R280 in order to cause the latter relay to restore. Upon restoring the pick-up relay R280 interrupts, at the contacts 284, the holding circuit for energizing the winding thereof; interrupts, at the contacts 281, further points in the multiple circuit for operating the signal relay R200 and the tone relay R210; interrupts, at the contacts 282, a further point in the circuit for operating the step relay R285; and prepares, at the contacts 283, the original circuit for operating the step relay R287. Accordingly, when the rotary magnet M294 restores the sixth time, it completes, at the contacts 296, the original circuit for operating the step relay R287; whereby the step relay R287 ineracts with the rotary magnet M294 in order to cause the wipers noted of the send switch SS295 to be driven into engagement with the seventh contacts in the associated contact banks; whereby there is completed an alternative circuit for energizing the winding of the pick-up relay R280 in order to cause the latter relay to reoperate. The circuit mentioned extends from the grounded send conductor C299 by way of the wiper 264 of the register switch RS260 and the engaged fifth contact in the associated contact bank, the jumper indicated, the wiper 298 of the send switch SS295 and the engaged seventh contact in the associated contact bank, the pick-up conductor C298 and the resistor 297′ to battery potential. Accordingly, the pick-up relay R280 reoperates in order again to effect interaction of the step relay R285 with the step relay R287 and the rotary magnet M294 and to condition the signal relay R200 and the tone relay R210 for reoperation.

In view of the foregoing description it will be appreciated that while the step relay R287 is interacting directly with the rotary magnet M294 that the wipers noted of the send switch SS295 are driven step by step in the counterclockwise direction at a relatively fast rate, and while the step relays R285 and R287 interact with the rotary magnet M294 the wipers noted of the send switch SS295 are driven step by step in the counterclockwise direction at a relatively slow rate. Accordingly, the send switch SS295 operates at the relatively fast rate until the pick-up relay R280 is operated; whereupon it operates at the relatively slow rate to transmit or send the first digit 1 of the code number 151 registered in the register switch RS250; at which time the pick-up relay R280 is restored. In a substantially identical manner the send switch SS295 again operates at the relatively fast rate until the pick-up relay R280 is reoperated; whereupon it operates at the relatively slow rate to transmit or send the second digit 5 of the code number 151 registered in the register switch RS260; at which time the pick-up relay R280 is restored. In a substantially identical manner, the send switch SS295 again reoperates at the relatively fast rate until the pick-up relay R280 is reoperated; whereupon it operates at the relatively slow rate to transmit or send the third digit 1 of the code number registered in the register switch RS270; at which time the pick-up relay R280 is restored. Specifically, the pick-up relay R280 is restored the third time mentioned when the wiper 298 of the send switch SS295 engages the eighteenth contact in the associated contact bank recompleting the previously traced path for short-circuiting the winding thereof. At this time the send switch SS295 operates at the fast rate to drive the wipers noted thereof into engagement with the twenty-fourth contacts in the associated contact banks; whereby further operation of the rotary magnet M294 is arrested since the grounded multiple is disengaged by the wiper 297 of the send switch SS295 when it disengages the twenty-third contact in the associated contact banks removing ground potential from the send conductor C299.

After a predetermined time interval, the vibrating armature RA215 of the timing relay R215 settles down interrupting, at the contacts 217 and 218, the circuit for energizing the winding of the timing relay R220; whereby the latter relay restores, it being of the slow-to-release type. Upon restoring the timing relay R220 completes, at the contacts 227, a path, including the conductor C227, the wiper 297 of the send switch SS295 and the engaged twenty-fourth contact in the associated contact bank for applying ground potential to the send conductor C299; whereby the step relay R287 operates in order to effect reoperation of the rotary magnet M294; whereby the step relay R287 restores effecting restoration of the rotary magnet M294. When the rotary magnet M294 is thus restored, the wipers noted of the send switch SS295 disengage the twenty-fourth contacts in the associated contact banks and are operated back into their home positions. When the wiper 297 of the send switch SS295 disengages the twenty-fourth contact in the associated contact bank, the path for applying ground potential to the send conductor C299 is interrupted; and when the wipers noted of the send switch SS295 are operated back into their home positions, the set of switch springs S296 are operated to close the contacts thereof in order again to prepare the original path for applying ground potential to the send conductor C299. Also upon restoring the timing relay R220 completes, at the contacts 224, multiple paths, including the grounded wiper 253 of the register switch RS250 and the engaged first contact in the associated contact bank, as well as the first contacts of the sets of switch springs S255, S265 and S275 for operating the respective release magnets M252, M262 and M272; whereby the wipers noted of the three register switches RS250, RS260 and RS270 are released and returned to their home positions; whereupon the sets of switch springs S255, S265 and S275 are operated. More particularly, the set of switch springs S275 is operated to open the second contacts thereof in order to interrupt the circuit for retaining operated the send relay R245. When the register switch RS250 is thus released, ground potential is removed from the hold conductor C248 effecting the release of the transfer relays R230 and R235.

In view of the foregoing it will be understood that the send switch SS295 operated to send the three digits of the code number 151; whereupon it is returned to its home position effecting the release of the register switches RS250, RS260 and RS270. Incident to operation of the send switch SS295, the three digits of the code number 151 were sent as a code signal by the signal bell B200 under the control of the signal relay R200 and corresponding splashes of signal tone were returned over the connection to the calling telephone station A under the control of the tone relay R210. Accordingly, the person at the calling telephone station A not only heard the audible code signals produced by the signal bell B200, but he also heard over the connection corresponding splashes of signal tone in the receiver of the associated telephone instrument.

The person at the calling telephone station A may wait a reasonable time interval for the person at the called telephone station B to answer the call; and in the event such person does not answer the call within a reasonable time interval, the person at the calling telephone station A may again dial the code number 151 in order to cause the same to be registered and then sent by the code circuit 50 in the manner previously explained. Thus the person at the calling telephone station A may cause the code number 151 to be registered and the corresponding code signal sent by the code call circuit 50 repeatedly. On the other hand after the person at the calling telephone station A has failed to contact the person at the called telephone station B, he may endeavor to contact some other person, such for example, as the person at the telephone station C. In order to accomplish this end, the person at the calling telephone station A after dialing the code number 151 assigned to the called telephone station B one or more times, he merely dials the code number assigned to the called telephone station C in order to cause the code number mentioned to be registered and the corresponding code signal to be sent by the code call circuit 50.

In the foregoing explanation of the mode of operation of the code call circuit 50 it was assumed that the three digit code number 151 was dialed at the telephone station A after the connector 30 of the link illustrated was operated to seize the trunk extending to the code call circuit 50; however, a two digit code number, such for example, as the code number 11 may be assigned to the called telephone station B. In this case the person at the calling telephone station A dials the two digit code number 11; whereby the first and second digits thereof are registered in the respective register switches RS250 and RS260 in the code call circuit 50, in the manner previously explained. In this example, when the second digit 1 of the code number 11 is registered in the register switch S260, the grounded wiper 263 thereof engages the first contact in the associated contact bank connected to the terminal B on the terminal board 276 which terminal B is connected to the terminal A on the terminal board 276. Accordingly, at the conclusion of the second digit 1 when the dial relay R205 restores effecting restoration of the control relay R240, a circuit is completed, at the contacts 243, incident to the restoration of the control relay R240 for operating the send relay R245; the circuit mentioned including the cross connection between the terminals A and B on the terminal board 276 as previously noted. Upon operating the send relay R245 effects operation of the send switch SS295 in the manner previously explained; whereby the code number 11 is sent thereby and then the register switches RS250 and RS260 are released; all in the manner previously explained. Repeated registration of the code number 11 and the consequent repeated sending of the corresponding signal code by the code circuit 50 is the same as that previously described.

Now assuming that when the code call circuit 50 operates to send the signal code corresponding to the code number 151 that the person to whom this code is assigned, who normally occupies the telephone station B, hears the audible signal code mentioned, this person proceeds to the nearest telephone station, such for example, as the telephone station B and initiates a call thereat. More particularly, in order to answer the call, the person at the telephone station B initiates a call and obtains the assignment of an idle link; whereby the finder thereof finds the telephone line 7 extending to the calling telephone station B. The person at the calling telephone station B then dials the code call directory number 00 in order to cause the connector of the link in use to seize the trunk extending to the code call circuit 50 and including the conductors C200, C201 and C202. At this time the connector of the link in use by the person at the calling telephone station B tests the trunk extending to the code call circuit 50 as being idle since battery potential is applied to the control conductor C202 thereof via the resistor 203. Accordingly, the connector of the link in use switches through seizing the trunk mentioned extending to the code call circuit 50 and completing a communication connection between the calling telephone station A and the calling telephone station B via the link illustrated, the other link mentioned and the multipled terminals of the line conductors C200 and C201 of the trunk extending to the code call circuit 50. More particularly a loop circuit is completed between the calling telephone station A and the line relay R140 in the finder 20 via the telephone line 1. Similarly, a loop circuit is completed between the calling telephone station B and the line relay in the other finder via the telephone line 7. The line relay R140 is operatively connected via a dry connection to the line relay in the other finder; which connection includes the condensers 128 and 129, the contacts 153, 155 and 163, 197 and the line wipers 196 and 197 of the Strowger mechanism 195, as well as the identical elements in the other connector. Recapitulating, it will be appreciated that the code call circuit 50 is not marked as busy in the connector 30 by virtue of the operated position of the code call relay R180; and likewise the code call circuit 50 is not marked as busy in the other connector by virtue of the operated position of the code call relay therein. In other words, the code call circuit 50 is marked as busy to the various connectors having access thereto only while the timing relay R220 occupies its operated position; which condition maintains only during the time interval that a code number is registered in the code circuit 50 and prior to the sending thereof and the consequent release of the register switches RS250, etc.

Accordingly, it will be understood that in the event the person at the calling telephone station A should register an incomplete code number or an unassigned code number in the register switches RS250, etc., in the code call circuit 50, that the incomplete or unassigned code number would not be sent by the send switch SS295 as the send relay R245 would not be operated. However, notwithstanding the registration of the incomplete or unassigned code number in the code call circuit 50, the timing relay R220 times out and restores after the predetermined time interval mentioned effecting the release of the registered switches RS250, etc. Accordingly, the arrangement including the timer relay R220 is effective to release the register switches RS250, etc., in order to clear any digits registered therein after a predetermined time interval; which time interval is of sufficient duration in order to permit the send switch SS295 to transmit code signal corresponding to the registered code number, provided the registered code number is a complete and assigned code number effecting operation of the send relay R245 as previously explained.

After the person at the telephone station B has answered the call by initiating another call thereat and by causing the other link to seize the code call circuit 50 as explained above, either the person at the calling telephone station A or the person at the calling telephone station B may dial another code number in order to effect operation of the code call circuit 50 to send the code signal corresponding to the registered code number. Accordingly, it will be understood that a third, etc., person may be called by the code call circuit 50 under the control of either the person at the calling telephone station A or the person at the calling telephone station B; whereby the third person mentioned may initiate a call at a third telephone station and obtain a third link and then dial the code call directory number 00 in order to cause the third link to select the trunk extending to the code call circuit 50, thereby to complete a conference connection including three or more calling telephone stations.

It is noted that when the connectors of the second and third links mentioned are operated in response to the code call directory number 00 to seize the trunk extending to the code call circuit 50 that ready tone is not transmitted thereto by the tone relay R210 since the lock relay R220*a* occupies its operated position.

The release of the established connection between the calling telephone station A and B or the conference connection involving the telephone stations A and B, as well as another telephone station, is under the control of the last person at a calling telephone station to disconnect. For example, assuming that the connection is established between the telephone stations A and B and that the person at the calling telephone station B disconnects first, when this is accomplished, the associated second link is released; whereby the connector thereof disengages the trunk extending to the code call circuit 50 interrupting one of the multiple paths for applying ground potential to the start conductor C204. Subsequently, when the person at the calling telephone station A disconnects the link illustrated is released in a manner substantially identical to that previously explained; whereby the code call relay R180 in the connector 30 restores along with the remainder of the relays therein to interrupt, at the contacts 184, the path for applying ground potential to the start conductor C204, thereby to interrupt the holding circuit for retaining operated the lock relay R220*a*. The lock relay R220*a* then restores effecting the complete release of the code call circuit 50.

When a person at a calling telephone station initiates a code call by dialing the code call directory number 00 in order to cause the associated link to seize the trunk extending to the code call circuit 50, he should challenge the connection in the event he does not receive ready tone from the tone relay R210 in the code call circuit 20 as such circumstance indicates that the code call circuit 50 is in use. This precaution is necessary since the code call circuit 50 is not normally marked as busy to the connectors having access thereto merely because it has been previously selected by the connector of another link; all as previously explained.

*Sect. 5.—Conference calls*

After a conference call has been set up utilizing the code call circuit 50 in the manner explained in Sect. 4, it is desirable that the telephone stations involved in the conference connection disconnect from the code call circuit 50 rendering it available for use by others and then connect to the conference circuit including the impedance 129. Specifically, each calling telephone station merely disconnects bringing about the release of the associated link and then initiates another call obtaining another link and then dialing the conference circuit directory number which may be 99. For example, assuming that the telephone station A is to be involved in the conference connection including the conference circuit the person thereat first initiates a call obtaining an idle link, such for example as the link illustrated. The person at the calling telephone station A then dials the conference circuit directory number 99. The connector 30 responds to the two digits 9 and 9; whereby the line wipers 196 and 197 of the Strowger mechanism 195 engage the contacts in the associated contact banks terminating the conductors extending to the opposite ends of the impedance element 129 included in the conference circuit; whereby the control wiper 198 of the Strowger mechanism 195 engages the contact in the associated contact bank terminating the conference conductor 199. Accordingly, at the conclusion of the second digit 9 battery potential is applied by way of the lower winding of the switch relay R160, the conference conductor 199, the control wiper 198 of the Strowger mechanism 195 and the engaged contact in the associated contact bank and the contacts 185 and 193 to the resistor 187, thereby to complete the previously traced path also, including the contacts 162, 153 and 181, for short-circuiting the upper winding of the test relay R170 in order to prevent operation of the latter relay. Shortly following the second digit 9, the dial relay R190 restores to complete, at the contacts 192, a circuit including the contacts 125 and 185, the control wiper 198 of the Strowger mechanism 195 and the engaged contact in the associated contact bank and the conference conductor 199, for energizing in series the upper and lower windings of the switch relay R160 in order to cause the latter relay to operate shortly thereafter, it being of the slow-to-operate type. Upon operating the switch relay R160 completes, at the contacts 163 and 167, a connection, including the contacts 153 and 155, the condensers 128 and 129 and the line wipers 196 and 197 of the Strowger mechanism 195, to the impedance element 129 included in the conference circuit; which connection is dry and extends to the line relay R140; which line relay R140 is included in the loop circuit extending back to the calling telephone station A. Accordingly, when persons at a number of calling telephone stations have initiated calls, obtained links and dialed the conference circuit directory number 99, a conference connection is completed involving the calling telephone stations mentioned. More particularly, the loop circuit extending between each calling telephone station and the line relay in the associated finder is operatively connected via the ossociated connector over the associated dry connection to the impedance element 129 included in the conference circuit; whereby a conference connection is completed between all of the involved calling telephone stations. While the conference connection is established any calling telephone station may enter by initiating a call, obtaining an associated link and by dialing the conference circuit directory number 99. Likewise any telephone station may retire from the conference connection merely by disconnecting in order to cause the release of the associated link. Of course, the conference connection is released when each calling telephone station involved therein disconnects effecting the release of all of the associated links mentioned.

*Sect. 6.—Fire alarm circuit*

As previously noted the code call circuit 50 comprises a fire alarm relay R289 that is connected to an associated fire alarm conductor C297, that, in turn, extends to any suitable fire call device, such for example, as the usual pull box, a thermostatic fire responsive switch, a sprinkler head or the like, indicated at ACD297; whereby ground potential is applied to the fire alarm conductor C297 when the fire call device is operated and is subsequently removed therefrom. The application of ground potential to the fire alarm conductor C297 effects operation of the fire alarm relay R289; whereby the latter relay completes, at the contacts 292, a path for connecting the grounded fire alarm conductor C297 to the send conductor C299 in order to initiate interaction of the step relay R287 and the rotary magnet M294 in the manner explained in Sect. 4. Also the fire alarm relay R289 interrupts, at the contacts 291, a point in the path for short-circuiting the winding of the pick-up relay R280; and completes, at the contacts 293, a path for applying ground potential to the first contact in the contact bank associated with the wiper 298 of the send switch SS295; whereby the previously traced circuit for operating the pick-up relay R280 is completed when the wipers noted of the send switch SS295 are driven away from their home positions into engagement with the first contacts in the associated contact banks. Also upon operating the fire alarm relay R289 completes, at the contacts 290, a path for applying ground potential to the first contacts of the sets of switch springs S255, S265 and S275; whereby the release magnets M252, etc., of any operated one of the register switches RS250, etc., is operated in order to bring about the release of the associated register switch RS250, etc. This arrangement insures that the fire alarm code will override any registered code number in the code call circuit 50 in the event the code call circuit 50 is busy in the extension of a code call as explained in Sect. 4, when operation of the fire alarm relay R289 takes place.

Upon operating the pick-up relay R280 cuts in the step relay R285; whereby the step relays R285 and R287 interact with the rotary magnet M294 in order to cause the send switch SS295 to be operated at the relatively slow rate. Each time the rotary magnet M294 operates, it completes, at the contacts 295, the circuit for operating the signal relay R200; whereby the latter relay completes, at the contacts 201, the circuit for operating the signal bell B200. Accordingly, in the present example, the wipers noted of the send switch SS295 are driven twenty-four steps in the counterclockwise direction away from their home positions in order to cause a corresponding operation of the signal bell B200 indicating a fire alarm code. At this time further operation of the send switch SS295 is arrested in the event the timing relay R220 occupies its operated position and assuming that ground potential has been removed from the fire alarm conductor C297. On the other hand, in the event the timing relay R220 occupies its restored position, the wipers noted of the send switch S295 are driven directly back into their home positions as a result of the application of ground potential at the contacts 227 upon the conductor C227. At this time further operation of the send switch SS295 is arrested since ground potential is removed from the wiper 297 thereof and consequently from the send conductor C299, assuming that ground potential has already been removed from the fire alarm conductor C297; whereby the fire alarm relay R289 restores. At this time the code call circuit 50 is completely released and available for further use.

*Sect. 6.—Conclusions*

In view of the foregoing, it is apparent that there has been prepared an automatic telephone system and code call apparatus, which combination is of improved connection and arrangement bringing about flexible operation thereof, whereby it may be employed not only for code signalling purposes but also in establishing conference connections.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system including a plurality of telephone stations, a plurality of automatic switching links, and code call apparatus; means controllable from a first of said stations for seizing a first of said links and for transmitting a given directory number thereto, means included in said first link and responsive to said given directory number for seizing said apparatus, means then controllable from said first station for transmitting a code number via said first link to said apparatus, means included in said apparatus for producing a code signal in accordance with a code number transmitted thereto, means controllable from a second of said stations for seizing a second of said links and for transmitting said given directory number thereto, means included in said second link and responsive to said given directory number for seizing said apparatus, and means responsive to seizure of said apparatus by said second link for completing a communication connection between said first and second stations via said first and second links.

2. In a telephone system including a plurality of telephone stations, a plurality of automatic switching links, and code call apparatus provided with a terminal set; means controllable from a first of said stations for seizing a first of said links and for operating it to seize said terminal set, means then controllable from said first station for transmitting a code number via said first link and said terminal set to said apparatus, means included in said apparatus for producing a code signal in accordance with a code number transmitted thereto, means controllable from a second of said stations for seizing a second of said links and for operating it to seize said terminal set, and means responsive to seizure of said terminal set by said second link for completing a communication connection between said first and second stations via said first and second links and said terminal set.

3. In a telephone system including a plurality of telephone stations, a plurality of automatic switching links, and code call apparatus; means controllable from a first of said stations for seizing a first of said links and for operating it to seize said apparatus, means controllable from a second of said stations for seizing a second of said links and for operating it to seize said apparatus so that a communication connection is completed between said first and second stations via said first and second links, means then controllable from said first station for transmitting a code number via said first link to said apparatus, means then controllable from said second station for transmitting a code number via said second link to said apparatus, and means included in said apparatus for producing a code signal in accordance with a code number transmitted thereto from either said first section or said second station.

4. In a telephone system including a plurality of telephone stations, and code call apparatus; means for setting up a conference connection from two or more of said stations to said apparatus, means then controllable from any one of said stations involved in said conference connection for transmitting a code number therefrom over said conference connection to said apparatus, and means included in said apparatus for producing a code signal in accordance with a code number transmitted thereto from any one of said stations.

5. In a telephone system including a plurality of telephone stations, a plurality of automatic switching links, and code call apparatus; means controllable from a first of said stations for seizing a first of said links and for operating it to seize said apparatus, means then controllable from said first station for transmitting a code number via said first link to said apparatus, said apparatus including cyclic means for registering a code number transmitted thereto and then for producing a code signal in accordance with the registered code number and then for clearing out the registered code number so that said apparatus may be recycled by the same or a different code number transmitted thereto from said first station via said first link, means controllable from a second of said stations for seizing a second of said links and for operating it to seize said apparatus, and means responsive to seizure of said apparatus by said second link for completing a communication connection between said first and second stations via said first and second links.

6. In a telephone system including a plurality of telephone stations, a plurality of automatic switching links, and code call apparatus: means controllable from a first of said stations for seizing a first of said links and for transmitting a given directory number thereto, means included in said first link and responsive to said given directory number for seizing said apparatus, means then controllable from said first station for transmitting a code number via said first link to said apparatus, said apparatus including cyclic means for registering a code number transmitted thereto and then for producing a code signal in accordance with the registered code number and then for clearing out the registered code number so that said apparatus may be recycled by the same or a different code number transmitted thereto from said first station via said first link, means controllable from a second of said stations for seizing a second of said links and for transmitting said given directory number thereto, means included in said second link and responsive to said given directory number for seizing said apparatus, and means responsive to seizure of said apparatus by said second link for completing a communication connection between said first and second stations via said first and second links.

7. In a telephone system including a plurality of telephone stations, a plurality of automatic switching links, and code call apparatus provided with a terminal set; means controllable from a first of said stations for seizing a first of said links and for operating it to seize said terminal set, means then controllable from said first station for transmitting a code number via said first link and said terminal set to said apparatus, said apparatus including cyclic means for registering a code number transmitted thereto and then for producing a code signal in accordance with the registered code number and then for clearing out the registered code number so that said apparatus may be recycled by the same or a different code number transmitted thereto from said first station via said first link and said terminal set, means controllable from a second of said stations for seizing a second of said links and for operating it to seize said terminal set, and means responsive to seizure of said terminal set by said second link for completing a communication connection between said first and second stations via said first and second links and said terminal set.

8. In a telephone system including a plurality of telephone stations, a plurality of automatic switching links, and code call apparatus; means controllable from a first of said stations for seizing a first of said links and for operating it to seize said apparatus, means controllable from a second of said stations for seizing a second of said links and for operating it to seize said apparatus so that a communication connection is completed between said first and second stations via said first and second links, means then controllable from said first station for transmitting a code number via said first link to said apparatus, and means then controllable from said second station for transmitting a code number via said second link to said apparatus, said apparatus including cyclic means for registering a code number transmitted thereto and then for producing a code signal in accordance with the registered code number and then for clearing out the registered code number so that said apparatus may be recycled by the same or a different code number transmitted thereto from said first station via said first link or from said second station via said second link.

9. In a telephone system including a plurality of telephone stations and code call apparatus; means for setting up a conference connection from two or more of said stations to said apparatus, and means then controllable from any one of said stations involved in said conference connection for transmitting a code number therefrom over said conference connection to said apparatus, said apparatus including cyclic means for registering a code number transmitted thereto and then for producing a code signal in accordance with the registered code number and then for clearing out the registered code number so that said apparatus may be recycled by the same or a different code number transmitted thereto from the same or a different one of said stations involved in said conference connection.

10. In a telephone system including a plurality of telephone stations, a plurality of automatic switching links, and code call apparatus; means controllable from a first of said stations for operating a first of said links to seize said apparatus in the event it is marked idle and then for transmitting a code number therefrom via said first link to said apparatus, said apparatus comprising means for registering a code number transmitted thereto and means for producing a code signal in accordance with the registered code number and then for clearing out the registered code number and means responsive to registering of a code number for marking busy said apparatus and responsive to clearing out of a registered code number for marking idle said apparatus, and means controllable from a second of said stations for operating a second of said links to seize said apparatus in the event it is marked idle in order to complete a communication connection between said first and second stations via said first and second links.

11. In a telephone system including a plurality of telephone stations, a plurality of automatic switching links, and code call apparatus;

means controllable from a first of said stations for operating a first of said links to seize said apparatus and then for transmitting a code number therefrom via said first link to said apparatus, said apparatus comprising a register and a timer and means responsive to a code number transmitted thereto for registering it in said register and for initiating operation of said timer and means responsive to registering of a complete code number in said register for producing a code signal in accordance therewith, and means responsive to a given timed operation of said timer for clearing out a code number registered in said register so that said register is cleared of any incomplete code number registered therein without the production of a code signal and is cleared of any complete code number registered therein after the production of a code signal, and means controllable from a second of said stations for operating a second of said links to seize said apparatus in order to complete a communication connection between said first and second stations via said first and second links.

12. In a telephone system including a plurality of telephone stations, a plurality of automatic switching links, and code call apparatus; means controllable from a first of said stations for operating a first of said links to seize said apparatus in the event it is marked idle and then for transmitting a code number therefrom via said first link to said apparatus, said apparatus comprising a register and a timer and means responsive to a code number transmitted thereto for registering it in said register and for initiating operation of said timer and means responsive to registering of a complete code number in said register for producing a code signal in accordance therewith and means responsive to a given timed operation of said timer for clearing out a code number registered in said register so that said register is cleared of any incomplete code number registered therein without the production of a code signal and is cleared of any complete code number registered therein after the production of a code signal and means responsive to registering of a code number in said register for marking busy said apparatus and responsive to clearing out of a code number registered in said register for marking idle said apparatus, and means controllable from a second of said stations for operating a second of said links to seize said apparatus in the event it is marked idle in order to complete a communication connection between said first and second stations via said first and second links.

13. In a telephone system including a plurality of telephone stations, a plurality of automatic switching links, and code call apparatus; means controllable from a first of said stations for operating a first of said links to seize said apparatus in the event it is marked idle and then for transmitting a code number therefrom via said first link to said apparatus, said apparatus comprising means responsive to seizure thereof by said first link for returning a ready signal thereover to said first station and means for registering a code number transmitted thereto and means responsive to the registering of a code number for arresting the return of said ready signal over said first link to said first station and for marking busy said apparatus and means for producing a code signal in accordance with the registered code number and then for clearing out the registered code number and means responsive to clearing out of a registered code number for marking idle said apparatus, and means controllable from a second of said stations for operating a second of said links to seize said apparatus in the event it is marked idle without the return of said ready signal therefrom in order to complete a communication connection between said first and second station via said first and second links.

14. In a telephone system including a plurality of telephone stations, a plurality of automatic switching links, and code call apparatus; means controllable from a first of said stations for operating a first of said links to seize said apparatus in the event it is marked idle and then for transmitting a code number therefrom via said first link to said apparatus, said apparatus comprising a tone relay and means responsive to seizure thereof by said first link for operating said tone relay to return a ready signal thereover to said first station and means for registering a code number transmitted thereto and means responsive to the registering of a code number for arresting operation of said tone relay to arrest the return of said ready signal over said first link to said first station and for marking busy said apparatus and means for producing a code signal in accordance with the registered code number and then for clearing out the registered code number and means responsive to clearing out of a registered code number for marking idle said apparatus, and means controllable from a second of said stations for operating a second of said links to seize said apparatus in the event it is marked idle without operating said tone relay in order to complete a communication connection between said first and second station via said first and second links.

15. In a telephone system including a plurality of telephone stations, a plurality of automatic switching links, and code call apparatus; means controllable from a first of said stations for operating a first of said links to seize said apparatus in the event it is marked idle and then for transmitting a code number therefrom via said first link to said apparatus, said apparatus comprising cyclic means for registering a code number and then for producing a code signal in accordance with the registered code number and then for clearing out the registered code number so that said apparatus may be recycled by the same or a different code number transmitted thereto from said first station via said first link and means responsive to registering of a code number for marking busy said apparatus and responsive to clearing out of a registered code number for marking idle said apparatus, and means controllable from a second of said stations for operating a second of said links to seize said apparatus in the event it is marked idle in order to complete a communication connection between said first and second stations via said first and second links.

16. In a telephone system including a plurality of telephone stations, a plurality of automatic switching links, and code call apparatus; means controllable from a first of said stations for operating a first of said links to seize said apparatus in the event it is marked idle and then for transmitting a code number therefrom via said first link to said apparatus, said apparatus comprising means for registering a code number transmitted thereto and means governed by the registered code number for sending a corresponding code signal and for returning a corresponding code signal tone via said first link to said first station and then for clearing out the registered code number and means responsive to registering of a code number for marking busy said apparatus and responsive to clearing out of a registered code number for marking idle said apparatus, and means controllable from a second of said stations for operating a second of said links to seize said apparatus in the event it is marked idle in order to complete a communication connection between said first and second stations via said first and second links.

17. In a telephone system including a plurality of telephone stations, a plurality of automatic switching links, and code call apparatus; and means controllable from a first of said stations for operating a first of said links to seize said apparatus in the event it is marked idle and then for transmitting a code number therefrom via said first link to said apparatus, said apparatus comprising a tone relay and means responsive to seizure thereof by said first link for operating said tone relay to return a ready signal thereover to said first station and means for registering a code number transmitted thereto and means responsive to the registering of a code number for arresting operation of said tone relay to arrest the return of said ready signal over said first link to said first station and for marking busy said apparatus and means governed by the registered code number for sending a corresponding code signal and for operating said tone relay to return a corresponding code signal tone via said first link to said first station and then for clearing out the registered code number and means responsive to registering of a code number for marking busy said apparatus and responsive to clearing out of a registered code number for marking idle said apparatus, and means controllable from a second of said stations for operating a second of said links to seize said apparatus in the event it is marked idle without operating said tone relay in order to complete a communication connection between said first and second stations via said first and second links.

18. In a telephone system including a plurality of telephone stations, a plurality of automatic switching links, and code call apparatus; means controllable from a first of said stations for operating a first of said links to seize said apparatus and then for transmitting a code number therefrom via said first link to said apparatus; said apparatus comprising N digit registers and means responsive to a code number transmitted thereto for registering the individual digits thereof in the respective ones of said digit registers and a sender operative to send a code signal in accordance with a code number registered in said digit registers and means responsive to the registering of a complete assigned code number comprising N–1 or N digits in N–1 or N of said registers for initiating operation of said sender, and means controllable from a second of said stations for operating a second of said links to seize said apparatus in order to complete a communication connection between said first and second stations via said first and second links.

19. In a telephone system including a plurality of telephone stations, a plurality of automatic switching links, and code call apparatus; means controllable from a first of said stations for operating a first of said links to seize said apparatus and then for transmitting a code number therefrom via said first link to said apparatus, said apparatus comprising a timer and N digit registers and means responsive to a code number transmitted thereto for initiating operation of said timer and for registering the individual digits thereof in the respective ones of said digit registers and a sender operative to send a code signal in accordance with a code number registered in said digit registers and means responsive to the registering of a complete assigned code number comprising N–1 or N digits in N–1 or N of said registers for initiating operation of said sender and means responsive to a given timed operation of said timer for clearing out the digit or digits of a code number registered in said digit registers so that said digit registers are cleared of any digits comprising an incomplete or unassigned code number registered therein without operation of said sender and are cleared of digits comprising a complete assigned code number registered therein after operation of said sender, and means controllable from a second of said stations for operating a second of said links to seize said apparatus in order to complete a communication connection between said first and second stations via said first and second links.

20. In a telephone system including a plurality of telephone lines, a plurality of automatic switches, and code call apparatus; means controllable over a calling first of said lines for extending a connection therefrom via a first of said switches to said apparatus and then for transmitting thereto a code number, said apparatus including a signal transmitter operative to transmit variable code signals and a fixed alarm signal and means controlled by said code number transmitted thereto for operating said signal transmitter to transmit a code signal in accordance with said code number, means controllable over a calling second of said lines for extending a connection therefrom via a second of said switches to said apparatus in order to complete a communication connection between said first and second lines via said first and second switches and said apparatus, an alarm call device operated in response to an alarm condition, means responsive to operation of said alarm call device for seizing said apparatus and for arresting operation of said signal transmitter in the event it is operating to transmit a code signal and for operating said signal transmitter to transmit said fixed alarm signal.

21. In a telephone system including a plurality of telephone lines, a plurality of automatic switches, and code call apparatus; means controllable over a calling first of said lines for extending a connection therefrom via a first of said switches to said apparatus and then for transmitting thereto a code number, said apparatus including a signal transmitter operative to transmit variable code signals and a fixed alarm signal and means responsive to said code number transmitted thereto for registering said code number and then for operating said signal transmitter to transmit a code signal in accordance with said registered code number and then for clearing out said registered code number, means controllable over a calling second of said lines for extending a connection therefrom via a second of said switches to said apparatus in order to complete a communication connection between said first and second lines via said first and second switches, an alarm call device that is adapted to be operated in the event of an alarm condition, and means responsive to operation of said alarm call device for clearing out any code number registered in said registering means and for operating said signal transmitter to transmit said alarm signal.

22. In a telephone system including a plurality of telephone lines, a plurality of automatic switches and code call apparatus; means controllable over a calling first of said lines for extending a connection therefrom via a first of said switches to said apparatus and then for transmitting thereto a code number, said apparatus including a signal transmitter operative to transmit variable code signals and a fixed alarm signal and means controlled by said code number transmitted thereto for operating said signal transmitter to transmit a code signal in accordance with said code number, means controllable over a calling second of said lines for extending a connection therefrom via a second of said switches to said apparatus in order to complete a communication connection between said first and second lines via said first and second switches and said apparatus, an alarm call device operated in response to an alarm condition, means responsive to operation of said alarm call device for seizing said apparatus and for blocking control of said signal transmitter over said first line and for operating said signal transmitter to transmit said fixed alarm signal, and means responsive to operation of said signal transmitter to transmit said fixed alarm signal for restoring control of said signal transmitter over said first line.

23. In a telephone system including a plurality of telephone lines, a plurality of automatic switches, and code call apparatus; means controllable over a calling first of said lines for seizing a first of said switches and then for operating it selectively to seize a called second of said lines if marked idle or to seize said apparatus if marked idle, means included in said first switch and responsive to seizure of said second line for completing a communication connection between said first and second lines and for marking busy said second line, means included in said first switch and responsive to seizure of said apparatus for completing an operative connection between said first line and said apparatus without marking busy said apparatus, means then controllable over said first line for transmitting a code number to said apparatus, means included in said apparatus for registering said code number and then for sending a code signal corresponding to said registered code number and then for clearing out said registered code number and for marking busy said apparatus only while said code number is registered therein, and means controllable over a calling third of said lines for seizing a second of said switches and then for operating it to seize said apparatus if marked idle in order to complete a communication connection between said first and third lines via said first and second switches.

24. In a telephone system including a plurality of telephone lines, a plurality of automatic switches, and code call apparatus; means controllable over a calling first of said lines for seizing a first of said switches and for operating it selectively to select a called second of said lines or to select said apparatus, means included in said first switch for testing the idle or busy condition of said second line or of said apparatus and for returning a busy signal over said first line in the event said second line or said apparatus is tested as busy and for seizing said second line or said apparatus in the event it is tested as idle, means included in said first switch and responsive to seizure of said second line for completing a communication connection between said first and second lines via said first switch and for marking busy said second line, means included in said first switch and responsive to seizure of said apparatus for completing an operative connection between said first line and said apparatus via said first switch without marking busy said apparatus, means then controllable over said first line for transmitting a code number to said apparatus, means included in said apparatus for registering said code number and then for sending a code signal corresponding to said registered code number and then for clearing out said registered code number and for marking busy said apparatus only while said code number is registered therein, means controllable over a calling third of said lines for seizing a second of said switches and for operating it to select said apparatus, and means included in said second switch for testing the idle or busy condition of said apparatus and for returning a busy signal over said third line in the event said mechanism is tested as busy and for seizing said apparatus in the event it is tested as idle in order to complete a communication connection between said first and second lines via said first and second switches.

25. In a telephone system including a plurality of telephone lines, a plurality of automatic switches, and code call apparatus; means controllable over a calling first of said lines for seizing a first of said switches and then for operating it selectively to seize a called second of said lines if marked idle in order to complete a communication connection between said first and second lines or to seize said apparatus if marked idle in order to complete an operative connection between said first line and said apparatus, means included in said first switch and normally responsive to seizure of a circuit thereby for marking busy the seized circuit, additional means included in said first switch and responsive to seizure of said apparatus thereby for disabling said marking means, means then controllable over said first line for transmitting a code number to said apparatus, means included in said apparatus for registering said code number and then for sending a code signal corresponding to said registered code number and then for clearing out said registered code number and for marking busy said apparatus only while said code number is registered therein, and means controllable over a calling third of said lines for seizing a second of said switches and then for operating it to seize said apparatus if marked idle in order to complete a communication connection between said first and third lines via said first and second switches.

26. In a telephone system including a plurality of telephone lines, a plurality of automatic switches, and code call apparatus; means controllable over a calling first of said lines for seizing a first of said switches and then for operating it selectively to seize a called second of said lines or said apparatus, means then controllable over said first line for transmitting a code number to said apparatus, means included in said apparatus and responsive to said code number transmitted thereto for sending a corresponding code signal, means controllable over a calling third of said lines for seizing a second of said switches and then for operating it to seize said apparatus, each of said switches including a source of battery current and a first relay for supplying battery current from said source to a calling line seizing said switch and a second relay for supplying battery current from said source to a called line seized by said switch and means responsive to seizure of said apparatus by said switch for completing a connection to said apparatus independently of said second relay and without the supply of battery current from said source to said apparatus.

27. In a telephone system including a plurality of telephone lines, a plurality of automatic switches, and code call apparatus; means controllable over a calling first of said lines for seizing a first of said switches and for operating it to select said apparatus, means included in said first switch for testing the idle or busy condition of said apparatus and for returning a busy signal over said first line in the event said apparatus is tested as busy and for seizing said apparatus in the event it is tested as idle, additional means included in said first switch for continuing the test of said apparatus and responsive to a subsequent test of said apparatus as idle for seizing said apparatus and for arresting the return of said busy signal over said first line, means then controllable over said first line for transmitting a code number to said apparatus, means included in said apparatus for registering said code number and then for sending a code signal corresponding to said registered code number and then for clearing out said registered code number and for marking busy said apparatus while said code number is registered therein, and means controllable over a calling second of said lines for seizing a second of said switches and then for operating it to seize said apparatus if marked idle in order to complete a communication connection between said first and second lines via said first and second switches.

FRANK KESSLER.

REFERENCES CITED

The following references are of record in the file of this patent:

UNITED STATES PATENTS

| Number | Name | Date |
|---|---|---|
| Re. 17,006 | Nelson | June 19, 1928 |
| 1,515,837 | Chapin | Nov. 18, 1924 |
| 1,626,034 | Gardner | Apr. 26, 1927 |
| 2,332,966 | Erwin | Oct. 26, 1943 |